United States Patent Office

3,681,195
Patented Aug. 1, 1972

3,681,195
METHOD OF TREATING YEAST
Mikio Suekane, Saitama-ken, and Chikako Satake, Tokyo, Japan, assignors to CPC International Inc.
No Drawing. Filed Feb. 24, 1969, Ser. No. 801,774
Int. Cl. A23j 1/18
U.S. Cl. 195—4         1 Claim

ABSTRACT OF THE DISCLOSURE

Covers a method of treating yeast. Paticularly covers a method of treating yeast by breaking down the yeast cell walls to realize a yeast product of increased digestibility and assimilation, and one which contains liberated proteins readily available for human and animal consumption. The yeast cell walls are treated at a relatively high temperature of at least 50° C. with a bacteria of the Bacillus genus or actinomycetes of the Thermoactinomyces genus.

---

Yeast is known to have a relatively high nutritive value and can be used as a food for man and as a fodder for animals. However, most effective utilization of the yeast components and particularly the protein component has not been afforded, due to the fact that the rigid yeast cell walls cause the yeast to be relatively indigestible and nonassimilable. This drawback makes the use of yeast inferior to use of animal proteins as a source of nutritive values.

In more detail, yeast cell walls are known to contain polysaccharides which are particularly resistant to attack, such as by decomposition due to chemical or enzymatic attack. For example, baker's yeast is known to contain glucan, mannan and chitin as yeast cell wall components which are only broken down or hydrolyzed with much difficulty.

A number of methods have been proposed to remove or break down the yeast cell walls, including use of cell wall-decomposing microorganisms. To date, these methods have not met with much success.

Therefore, it becomes an object of the invention to provide a method of treating yeast.

A specific object of the invention is to provide a method of treating yeast by breakdown of the yeast cell walls through enzymatic attack whereby an improved yeast product is obtained which can be more easily digested and assimilated and particularly contains readily available high nutritive value already liberated or freed proteins which may be utilized directly by humans and animals.

A still further object of the invention is to carry out the above method in an economical and practical manner whereby the resultant yeast product can be used as a source of easily digestible food which can be used as a food supplement in such foods as bread, sausage, cheese, etc.

Other objects will appear hereinafter.

In accordance with the invention a novel method of treating yeast has been discovered whereby the yeast cell walls are broken down and proteins and other desired ingredients liberated therefrom. The resultant yeast product, due to destruction of the highly undigestible cell walls, are thus more easily digested and assimilated by humans and animals alike. The product may thus be particularly used as a human food supplement or in animal fodder.

The method of the invention is broadly carried out by treating the yeast at rather highly elevated temperatures, say at least above about 50° C. with specific cell wall lytic enzyme preparations. These enzyme preparations are derived either from a thermophilic bacteria of the Bacillus genus or a thermophilic actinomycetes of the Thermoactinomyces genus. The treatment is carried on for a sufficient time to allow breakdown of the cell walls and realize a thus-treated yeast product possessing the above described properties.

By the term "thermophilic" is meant to describe an organism capable of growth and enzymatic activity at a relatively high temperature. By the term "lytic," as used in describing useful enzymes here, is meant an enzyme preparation capable of breaking down or decomposing some particular substrate acted upon, in this case, the cell walls of yeast.

The specific genera of bacteria and actinomycetes useful here are well known classes of organisms as generally described above and need little elaboration. The essence of the invention lies in the discovery that these particular bacteria and actinomycetes, productive of the thermophilic cell wall lytic enzyme preparations are useful in the heat breakdown or decomposition of yeast cell walls. Since these enzyme preparations are heat-resistant, and in fact, have greatly accelerated activities and increased rates of activity at elevated temperatures, it has been found that the complete breakdown of the yeast cell walls can be accomplished in a remarkably short time. That is, the enzymatic reaction can be completed by means of a relatively rapid process compared to like methods involving microbial attack. Moreover, due to the condition of heat applied during the process, bacterial contamination is kept to a minimum or even prevented entirely. Lastly, it has been determined that the reaction is fairly selective, particularly due to the condition of heat, whereby deleterious activities of other enzymes which may be present are substantially inhibited or prevented. In essence, product contamination is thus avoided.

Particularly preferred strains that have been found especially useful here among the two genera or classes are *Bacillus stearothermophilus, Thermoacetinomyces vulgaris, Bacillus circulans,* and *Bacillus coagulans.*

Cultures of these organisms have been deposited in the American Type Culture Collection, Washington, D.C., and added to its permanent collection of microorganisms. They have been assigned the following designations: *Bacillus stearothermophilus:* ATCC No. 21365; *Thermoactinomyces vulgaris:* ATCC No. 21364; *Bascillus circulans:* ATCC No. 21367; and *Bacillus coagulans:* ATCC No. 21366. We have found that by utilizing these species or others, we can obtain particularly useful enzyme preparation which has excellent utility in breaking down yeast cell walls to liberate proteins and other desired ingredients.

These strains were isolated from soil samples in the following manner:

About 2 grams of soil sample was suspended in 10 ml. of distilled water and then 1 ml. of the suspension was poured into 9 mm. petrie dishes containing 15 ml. of an agar medium containing 2% baker's yeast and 3% agar (pH adjusted to 7.0 by addition of potassium hydroxide). The agar medium was prepared by mixing a melted agar solution and yeast cell suspension. The petrie dish was then incubated at 55° C. for one week and colonies of organisms picked up on agar slants.

As mentioned above, the bacteria and actinomycetes, utilized to produce the thermophilic cell wall lytic enzymes used in the invention, are well known. For sake of reference, the taxonomical properties of two of these, *Bacillus stearothermophilus*, and *Thermoactinomyces vulgaris*, preferred for use in the invention, are described below.

Thermoactinomyces vulgaris (1) True aerial mycelium produced. Spore formed singly on sporophores.

(2) Vegetable growth: Grows well on organic and synthetic media at 55° C. Hyphae about $0.8\mu$ in diameter. No soluble pigment.

(3) Aerial mycelium: Well developed, white, powder. Sporophore very short, not exceeding 2 microns in length. Sphaerical spores, 0.5 to 1.0 micron in diameter, are produced at the end of short branches.

(4) Gelatine: Liquefaction.

(5) Synthetic agar: Colorless growth, covered with white, powdered aerial mycelium.

(6) Glucose asparagine agar: Colorless growth, white powdery aerial mycelium. No soluble pigment.

(7) Milk: Coagulated and peptonized.

(8) Starch is hydrolyzed.

(9) Optimum temperature: 55° C. No growth at 28° C.

Bacillus stearothermophilus (1) Rod-shaped, capable of producing endospores 0.6 to 1.0 by 2.0 to 5.0 microns. Gram-positive occurring in filaments.

(2) Aerobic.

(3) Catalase positive.

(4) Grows at 65° C. No growth at 28° C.

(5) No gas from glucose, fructose, galactose, xylose, arabinose, saccharose, lactose, maltose, trehalose, raffinose, dextrin, starch, meribiose, inulin, sorbitol and rhamnose.

(6) Saprophyte. Good growth on usual media as nutrient and malts broth.

(7) Starch is hydrolyzed.

(8) Indole and acetylmethyl carbinol not produced.

The process of the invention is simply and conveniently carried out by adding the appropriate enzyme preparation to yeast. In most instances the cell break-down of the yeast is effected in aqueous media. For best results, the pH of the yeast undergoing cell decomposition is maintained within a pH range of from about 6 to about 8. The relatively narrow pH range is usually maintained by addition of an appropriate buffer. A typical pH of a yeast medium being processed here is about 7.5.

As noted above, the method here of yeast cell breakdown is carried out at a relatively high temperature range, with attendant advantages as described above. The yeast treatment should normally be carried out at a temperature greater than 50° C., and more often is effected at a temperature of at least 70° C. A typical treatment temperature range is 70–90° C.

The time of treatment can be greatly varied, particularly according to the extent of the cell break-down one desires. In the usual case the treatment is carried out for a time ranging from about 5 minutes to about 120 minues, and more often is completed in from 5 to 30 minutes.

After the treatment is completed, the resultant yeast product is then cooled to room temperature whereupon enzymatic activity is terminated. The product may be used as such or dried as desired.

The yeast product as noted above is extremely useful as a food supplement or as an animal feedstuff additive. Due to breakdown of the rigid, relatively non-digestible cells, the thus-treated product is easily digested and assimilated by humans and animals alike. Moreover, the desired cell ingredients have now been freed and are readily available for consumption. In addition to the liberated protein other highly nutritive materials contained within the cell wall are freed for ready consumption. Other freed nutritive materials include vitamins, minerals such as phosphorus and iron, fats, carbohydrates, etc.

The resultant yeast product is useful in a variety of foodstuffs such as in bread, sausage, cheese, etc.

The following examples illustrate preparation of typical enzyme preparations useful in the invention. These examples are presented for illustrative purposes only, and are not meant to be limiting upon the invention.

EXAMPLE I

A medium containing 2% commercial compressed yeast was first adjusted to pH 7.0 After sterilization of the medium at 120° C. for 15 minutes, *Bacillus stearothermophilus* was inoculated in the medium and shaker-cultured at 55° C. for 2 days.

The culture liquid was centrifuged and a clear crude enzyme solution obtained as a supernate. This enzyme solution could be used as such or put into dry form as follows.

The crude enzyme solution was first condensed under vacuum. Then ammonium sulfate was added to the condensed enzyme solution in an amount of 390 g. per liter of solution to precipitate the enzyme. In an alternate procedure the ammonium sulfate was added directly to the original crude enzyme solution. In either case, the resultant enzyme precipitate was then dissolved in water and lyophilized after dialysis. This resulted in a tasteless, odorless enzyme powder.

EXAMPLE II

The procedure of Example I was followed with the exception that *Thermoactinomyces vulgaris* was inoculated into the yeast medium.

The following examples illustrate the process of the invention, and particularly elaborate the effectiveness of the above enzyme preparations in breaking down yeast cell walls whereby nitrogenous materials such as proteins are released.

EXAMPLE III

A mixture of 1 g. (dry) of commercial yeast and 1 ml. of the crude enzyme solution of Example I was diluted to a total amount of 10 ml. with a buffered aqueous solution (pH 6.0). After the above solution was heated to 80° C. for ten minutes, the liquid was again adjusted to a pH of 6.0 and centrifugated. The supernatant obtained was measured for total nitrogen content by the Kjeldahl method. After subtracting from this value the amount of nitrogen found in the original crude enzyme solution, it was determined that 90% of the nitrogen content originally available in the yeast was extracted from the yeast cells by action of the enzyme solution.

In a comparative test, the same above procedure was conducted with the same crude enzyme solution with the exception that the enzyme solution had been previously inactivated by heating at 100° C. for 30 minutes.

The amount of nitrogen extracted in this instance was 15%. The above demonstrates the fact that through use of an appropriate thermophilic cell wall lytic enzyme, one is able to improve the amount of nitrogen extracted by 75% compared to a like run effected under the exact conditions without active enzyme present. It is readily seen therefore that the high temperature treatment of yeast with the appropriate enzyme preparation is an excellent process to break down yeast cell walls and elute the yeast contents.

EXAMPLE IV

Example III was run with the exception that the enzyme preparation was that derived from *Thermoactinomyces vulgaris*. Equally good results were obtained in terms of rapid decomposition of yeast cell walls and release of protein.

EXAMPLE V

In this series of experiments, the enzyme preparation of Example I was first heated for varying amounts of time at different temperatures. Residual or remaining activity of the enzyme preparation was then measured, based on the activity of the enzyme before heating as being arbitrarily set at 100. Table I below shows that the enzymes may be heated at relatively high temperatures and for relatively long amounts of time before being heat inactivated.

TABLE I

| Temperature, ° C. | Time, minutes | Residual enzymatic activity |
|---|---|---|
| 90 | 10 | 60 |
| 90 | 20 | 50 |
| 90 | 30 | 45 |
| 100 | 5 | 60 |
| 100 | 10 | 45 |
| 100 | 20 | 8 |
| 100 | 30 | 0 |

EXAMPLE VI

Here, the procedure outlined in Example III was run at various temperatures of 40° C., 60° C., 80° C. and 100° C. and for time periods ranging up to 120 minutes. It was found that the optimum reaction temperature of the enzyme preparation used in Example III, in terms of rate of nitrogen extraction was around 80° C., with maximum nitrogen extraction rate being reached in about 10 minutes and thereafter leveling off.

EXAMPLE VII

*Bacillus stearothermophilus* was grown in a medium containing 5% commercial compressed yeast, 1% $(NH_4)_2SO_4$, 0.05% $MgSO_4 7H_2O$ and 0.0001% $CoSO_4 7H_2O$. The pH of the medium was adjusted to 7.0 and then shaker-cultured at 55° C. for 24 hours.

From the culture liquid, a partially purified enzyme was obtained by salting out with 0.6 saturation of ammonium sulfate.

Thereafter, a mixture of 300 ml. of 10% commercial yeast solution bufferized with 0.05 M phosphate buffer (pH 7.5) and 140 ml. of the above partial purified enzyme solution (6.5 mg. protein/ml.) was heated to 60° C. for an hour. After incubation, the liquid was measured for indigestible protein content and it was determined to be 0.69 g.

In a comparative test, the same above procedure was conducted using deionized water in place of the partially purified enzyme solution. The amount of indigestible protein in this instance was 2.58 g.

The above demonstrated the fact that 73% of indigestible protein was removed through the enzymatic reaction.

It is readily seen therefore that the use of an appropriate cell wall lytic enzyme is an excellent way to improve the nutritive value of yeast.

EXAMPLE VIII

Example VII was run in the same manner with the exception that the enzyme preparation was made from *Thermoactinomyces vulgaris*. Equally good results were obtained in terms of improvement of digestibility of yeast.

EXAMPLE XI

Example VII was run as above with the exception that the supernate obtained from the incubated mixture by centrifugation was analyzed for reducing sugar measured as glucose. It was determined as 0.44 g. for the sample here as against 0.06 g. for a control.

This indicates that the highly undigestible ingredients of cell walls such as glucan, mannan and chitin were hydrolyzed and converted to the assimilable sugars.

EXAMPLE X

Example IX was run with the exception that the enzyme preparation was made from *Thermoactinomyces vulgaris*. Equally good results were obtained in terms of decomposition of the undigestible ingredients of yeast.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claim.

The invention is hereby claimed as follows:

1. A method for treating yeast cells to make them more readily assimilable, which comprises treating the yeast cells in an aqueous medium at a pH in the range from 6 to 8 and at a temperature in the range from 50° C. to 90° C. with a cell wall lytic enzyme preparation produced by a microorganism selected from the group consisting of *Bacillus stearothermophilus* strain ATCC No. 21365, *Bacillus coagulans* strain ATCC No. 21366, and *Thermoactinomyces vulgaris* strain ATCC No. 21364, for from about 5 minutes to about 120 minutes, to break down the cell walls, and recovering a treated yeast product that is more easily digestible and assimilable, and that particularly contains liberated high nutritive value protein in readily assimilable form.

References Cited

UNITED STATES PATENTS 3,268,412   8/1966   Champagnat et al. _____ 99—96

OTHER REFERENCES

Tanaka et al.: "Enzymatic Hydrolysis of Yeast Cell Walls," Journal of Bacteriology, June 1965, pp. 1570–1580, vol. 89, No. 6.

Sugimoto: "Lysis of Yeast Cell Wall by Enzymes From Streptomycetes," Agr. Biol. Chem., vol 31, No. 10, pp. 1111–1123, 1967.

LIONEL M. SHAPIRO, Primary Examiner

R. M. ELLIOTT, Assistant Examiner

U.S. Cl. X.R.

99—9, 14, 97; 195—2